UNITED STATES PATENT OFFICE.

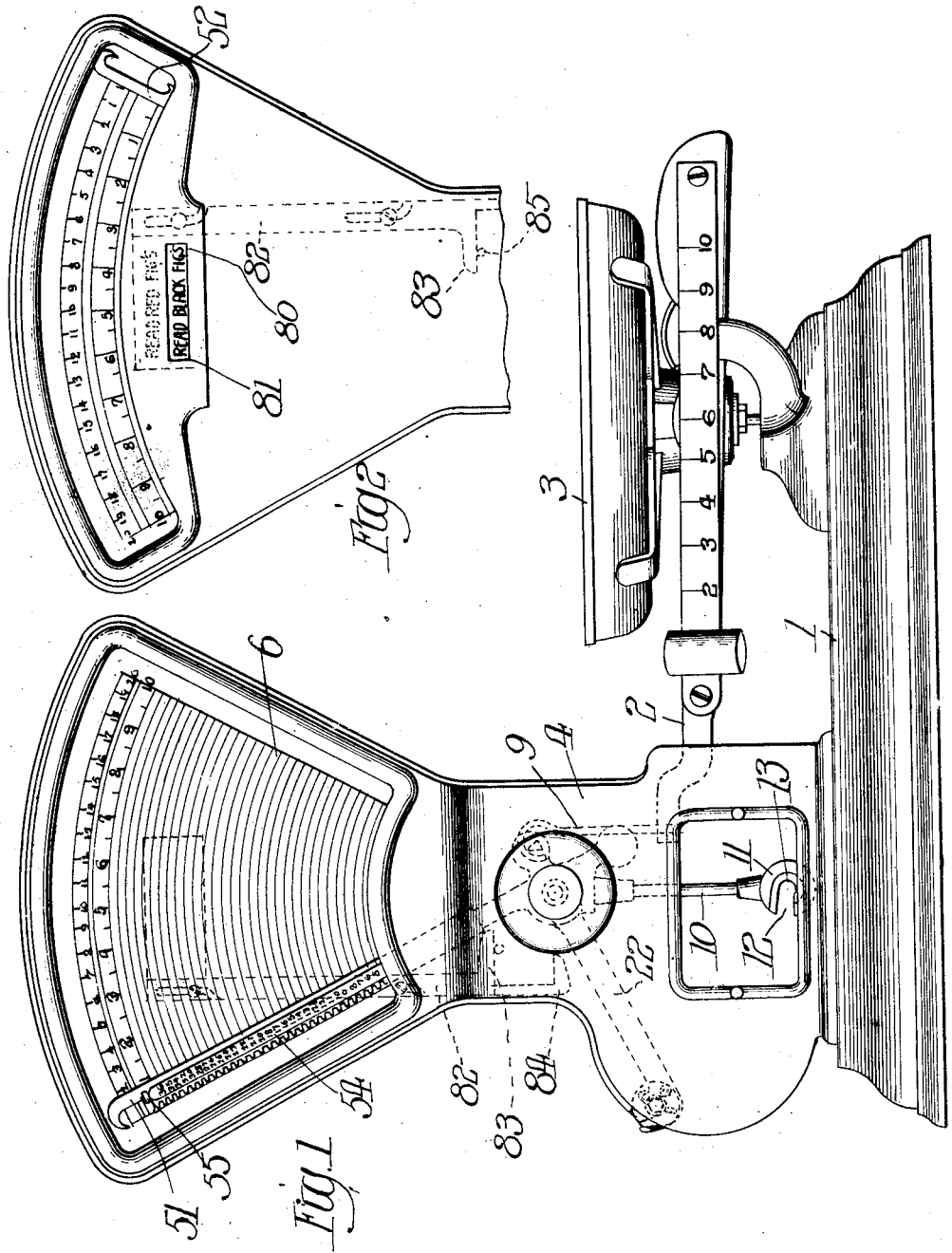

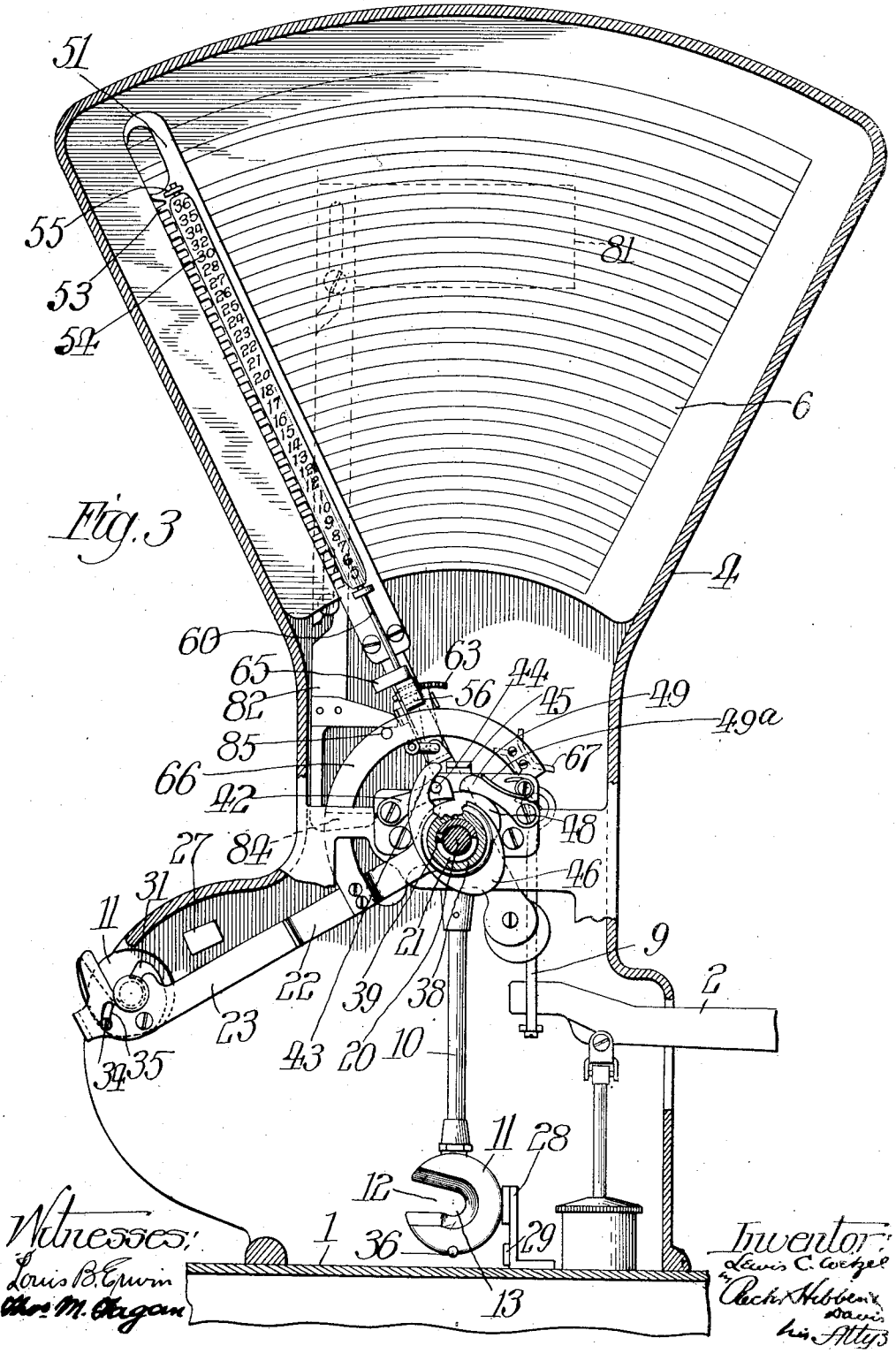

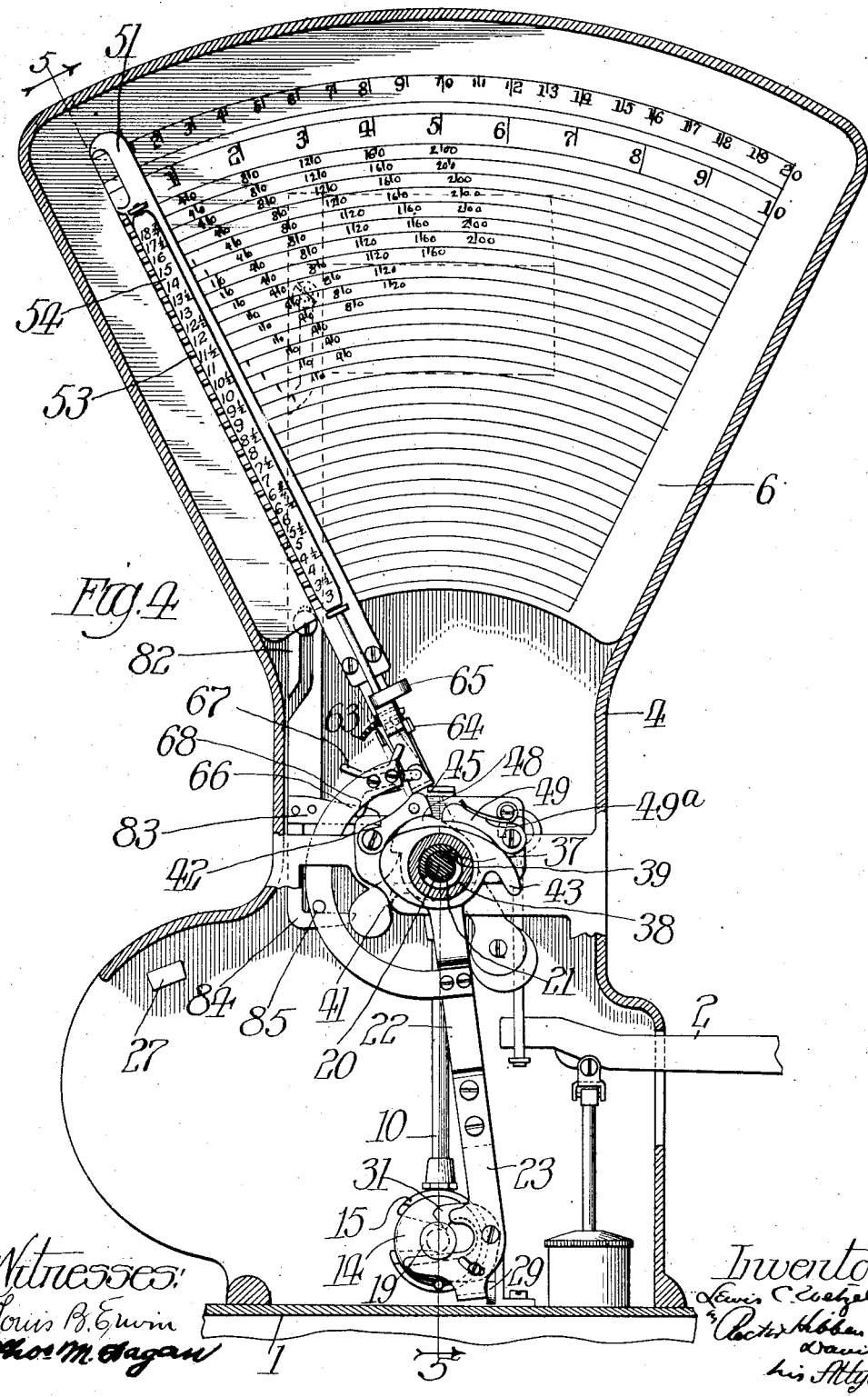

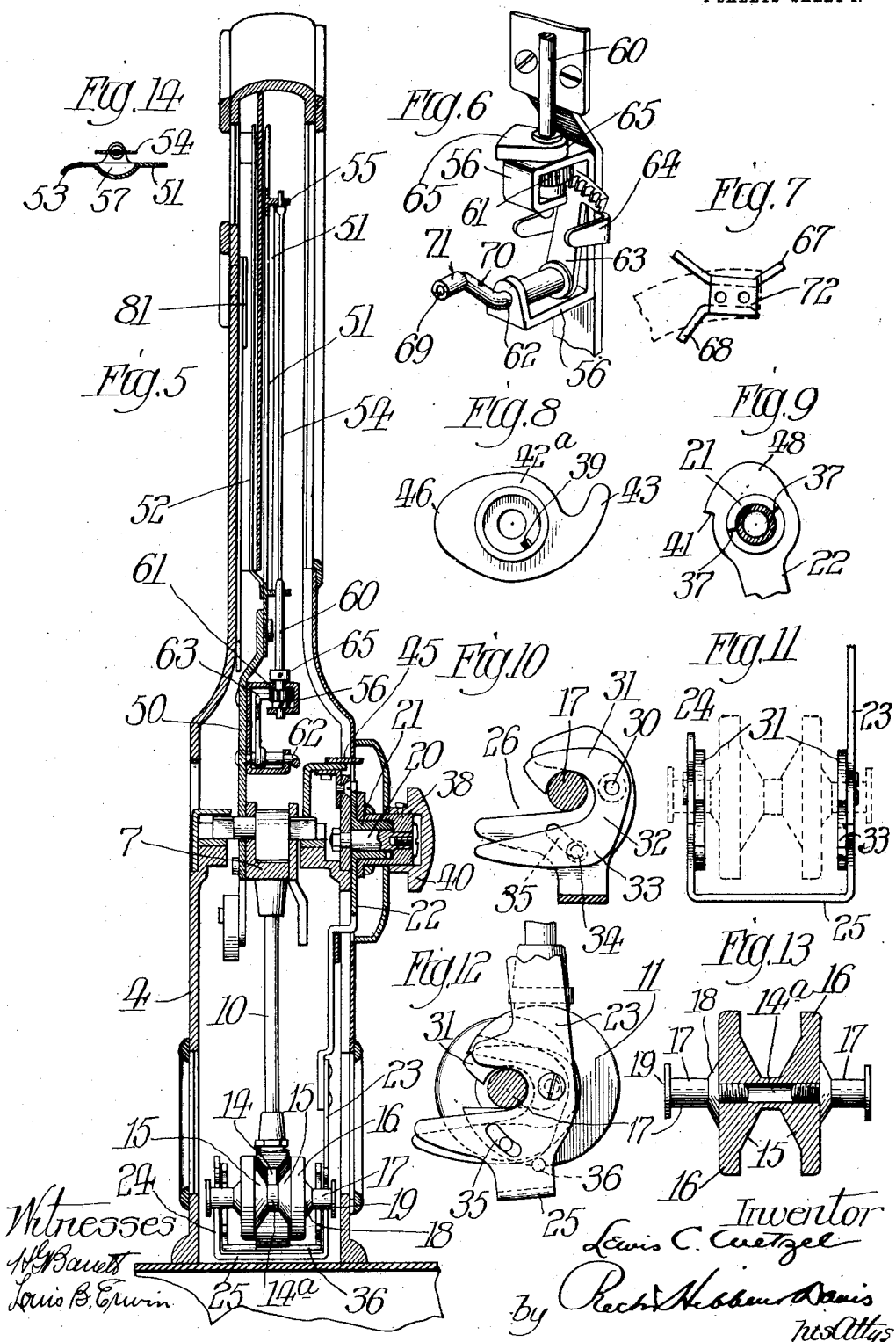

LEWIS C. WETZEL, OF TOLEDO, OHIO, ASSIGNOR TO TOLEDO COMPUTING SCALE COMPANY, OF TOLEDO, OHIO, A CORPORATION OF NEW JERSEY.

WEIGHING AND COMPUTING SCALE.

998,220.

Specification of Letters Patent.   Patented July 18, 1911.

Application filed August 27, 1907.  Serial No. 390,307.

*To all whom it may concern:*

Be it known that I, LEWIS C. WETZEL, residing at Toledo, in the county of Lucas and State of Ohio, have invented certain new and useful Improvements in Weighing and Computing Scales, of which the following is a specification.

The present invention relates to pendulum weighing scales and although not necessarily confined in all of its uses to computing scales, nevertheless it is particularly adapted for utilization in this latter type of apparatus, wherein it is customary to employ an auxiliary weight which, when placed upon the pendulum increases the weighing and computing capacity of the scales. It has been common heretofore in commercial usage of pendulum scales to employ such an auxiliary weight, the same being placed upon or removed from the pendulum by hand. In the particular type of pendulum scales, to which the invention is especially adapted, it is customary to employ a chart or table of computations and weights, together with an index hand carried by the pendulum and arranged to sweep over such chart or table, said hand having inscribed upon it one or more rows of price numerals. The pendulum is appropriately connected with a scale beam carrying a platter, on which the commodity to be weighed is placed. The weight of such commodity causes the index hand to move over the chart and properly indicate the weight of the commodity by pointing to one of the weight numerals on the chart or a graduation mark associated therewith. The particular numeral on the index hand denoting the price per pound or other unit of measure locates the proper computation, the index hand being usually formed along one edge in such manner as to assist in locating the computation, as for instance, being formed with series of fingers spaced apart to correspond with the price numerals. To provide for an increased weighing capacity such as effected through the medium of the auxiliary weight on the pendulum, it is customary to inscribe two rows of weight numerals on the chart, one representing double the weighing range of the other and to inscribe upon the index hand two parallel rows of price numerals, each numeral of one row being double the companion numeral of the other row. Contrasting colors are ordinarily employed, so that the user of the scale, as well as the customer, may readily perceive whether the scales are being used under one weighing capacity, or the other and there will be no mistake in the use of the price numerals for determining the proper computation.

One object of the present invention is to provide improved means for placing the auxiliary weight upon the pendulum and removing it therefrom, which means render it entirely unnecessary for the user of the scales to handle the auxiliary weight, the latter remaining at all times within the casing of the machine. Thus, the invention provides for the removal of the auxiliary weight from the pendulum by simply turning a knob which protrudes from the casing of the scale, the carrier for the auxiliary weight being then automatically caught and held beyond the range of the pendulum's swing. The replacing of the auxiliary weight upon the pendulum, involves merely the turning of the knob in the opposite direction, said carrier and the auxiliary weight being thus caused to fall by gravity and the said weight being automatically deposited upon the pendulum while the carrier takes up a position out of the range of the pendulum's swing. To state more specifically the object of the invention in this connection, it may be said that the same is to effectually guard against any possible escape of the auxiliary weight in the process of its removal from, or replacement upon, the pendulum, even though the manipulation of parts provided for the proper handling of the auxiliary weight be done carelessly, or with intentional violence.

Another object of the invention is to render it impossible to confuse the two sets of price numerals. Although the scheme of contrasting colors above referred to has been found to suffice in ordinary use of scales of the above defined type and ordinarily intelligent persons would experience no difficulty in this regard, in use or observation of the scales when employed under either weighing capacity, still, it might happen that users or customers not endowed with much intelligence would erroneously read the chart, confusing price numerals. Furthermore, unscrupulous persons seeking to decry the scales, might use specious arguments, based upon the possible mistaken use of a price numeral of one row rather than the other. Wherefore, the present invention provides for displaying one row of price numerals at a time and automatically governing the display of price numerals in conjunction with the control of the auxiliary weights. To further particularize with reference to this object of the invention, it may be said that the main aim is to provide connections which will operate with precision as the auxiliary weight is removed from or placed upon the pendulum to effect the change in display of price numerals and will be of such character as to effectually guard against derangement through violent usage.

With these and incidental objects in view, the invention consists in certain novel features of construction and combinations of parts, the essential elements whereof are recited in the appended claims and a preferred form of embodiment of which is illustrated in the accompanying drawings and described in detail hereinafter.

Of said drawings, Figure 1 represents in side elevation as the same would be viewed by the user, scales of the type hereinbefore mentioned, having embodied therein the improvements of the present invention; Fig. 2 represents a portion of such scales, as the same might be viewed from the opposite side by the customer; Fig. 3 represents the major portion of the scales with the casing and some other parts broken away and in section, but the mechanism for the most part appearing in elevation, under normal conditions, with the auxiliary weight off the pendulum; Fig. 4 is a similar view illustrating the changed relations of parts when the auxiliary weight is on the pendulum; Fig. 5 represents a vertical cross section taken substantially on the line 5—5 of Fig. 4; Fig. 6 represents in perspective certain details of the means for changing the display of price numerals; Fig. 7 is an elevational detail in the same connection; Fig. 8 is an elevation of the inner end of a knob structure comprising a sleeve and cam disk employed in connection with the auxiliary weight carrier; Fig. 9 is an elevational detail of a portion of said carrier; Fig. 10 is a sectional detail of another portion of said carrier; Fig. 11 is an edge view of the latter portion of the carrier; Fig. 12 shows this portion of the carrier in elevation, together with the permanent pendulum weight and the removable weight illustrating the relation of parts when the latter weight is about to be deposited upon the pendulum; Fig. 13 shows the auxiliary weight in longitudinal section; and Fig. 14 is a sectional detail of the index hand.

It will not be necessary to give a detailed description of the particular type of scales here chosen for purposes of illustrating the preferred embodiment of the invention, because that type of scales is well known through extensive commercial use and a considerable number of prior patents, (see for example the De Vilbiss re-issued Patent No. 12,029, issued September 9, 1902.)

Referring first to Fig. 1, reference numeral 1 designates the usual supporting base, 2 the scale beam, fulcrumed on a standard rising from said base, 3 the scale pan or platter suitably supported upon said scale beam, 4 the casing or housing erected upon the base and into which one end of the scale beam 2 extends, and 6 a fan-shaped plate mounted in the upper part of said housing and bearing on one side the chart or table of computations and the two rows of weight numerals and on the opposite side two corresponding rows of weight numerals, as shown in Fig. 2. The primary pendulum structure comprises a hub or boss 7 having a crank arm connected by a link 9 with scale beam 2, and a depending stem 10 weighted at its lower end. The permanent pendulum weight is in the form of a disk 11 formed with a flaring opening 12 in one side, terminating in a circular socket 13 centrally located with reference to the circumference of the disk and providing a slight depression at the inner end of the lower side of the opening 12. The portions of the disk surrounding this opening and the socket are substantially V-shaped in cross section, as shown in Fig. 5, this formation not, however, continuing to a sharp edge, but terminating in a narrow flat surface 14. The auxiliary weight takes something the shape of a dumb-bell, the same comprising a reduced central portion 14$^a$ of the same lateral extent as the said flat surface 14 and two side portions 15 in the form of truncated cones, whose angles correspond with those of the V-shaped portions of the permanent weight. Beyond these side portions 15, the auxiliary weight is formed with flanges 16 designed to take over the sides of the permanent weight beyond the V-shaped portions thereof. Projections in the nature of trunnions 17 of hardened metal are centrally secured in opposite sides of the auxiliary weight, these trunnions having conical base portions 18 and terminal flanges 19, for a purpose which will hereinafter become apparent.

It will be seen that the above described formations of the permanent and removable weights insures a perfectly accurate and correct engagement between them and one which cannot readily be disturbed when once established. The reduced central portion of the auxiliary weight seated in the socket of the permanent weight is held against accidental removal in a radial direction and the engagement of the conical portions 15 with the converging surfaces of the permanent weight, as well as the engagement of the flanges 16 over the sides of the latter, will prevent any axial displacement. Furthermore, the conical and V-shaped formations provide for the ready entrance of the auxiliary weight into the flaring opening of the permanent weight and the guidance of said auxiliary weight to its seat. It will be noted that when seated in the permanent weight, the auxiliary weight is exactly central of said permanent weight and that a central longitudinal line of the pendulum bisects the auxiliary weight. Such a formation of pendulum weights as above described is advantageous not only in connection with the removal and replacement of the weight through instrumentalities hereinafter described, but also when the auxiliary weight is one intended to be simply removed and replaced by hand.

Passing now to a description of the means employed for removing and replacing the auxiliary weight through manipulation of a handle or knob protruding from the casing, the reference numeral 20 designates a journal stud or shaft secured to a cross bar or the casing and projecting forwardly therefrom. On this stud is journaled a sleeve 21 formed integral or made rigid with an arm 22 depending within the casing alongside the pendulum. This arm carries a hanger comprising side pieces 23 and 24, the former of which is practically a continuation of said arm, and a connecting base piece 25, the latter adapted to swing under the pendulum weight 11 while the side pieces 23 and 24 pass on either side of the latter. Each of these side pieces is formed with a flaring opening 26 adapted to receive a trunnion 17 of the auxiliary weight, as clearly illustrated in Fig. 10 and it will be obvious that the swinging of the arm 22 to the left from the position in which it appears in Fig. 4, will bring the lower edges of said flaring openings 26 into engagement with the trunnions 17 and cause the auxiliary weight to be then carried to the left and upward into the casing. The engagement of the central portion of the auxiliary weight in the depression of the permanent weight at the inner end of the lower side of the flaring opening 12 of the latter, may cause the entire pendulum structure to be carried to the left when the arm 22 is swung in that direction, but the swinging of the pendulum is limited by abutment of the stem 10 against the lug 27, whereas the arm 22 can move farther and when so moved the auxiliary weight will be lifted out of said depression and the pendulum will then drop back to normal. However, the disengagement of the auxiliary weight from the permanent weight is likely to occur before the pendulum stem encounters said lug because, of course, as the pendulum rises the resistance to removal of the central portion of the auxiliary weight from said depression becomes less and all the time the lower edges of the openings 26 are tending to lift the auxiliary weight. When this disengagement takes place the trunnions 17 of the auxiliary weight lodge in the bases of said openings 26, as illustrated in Fig. 3, and with the arm 22 detained at the limit of its upward swing through means hereinafter described, the permanent pendulum weight is free to swing through its full range without being affected by the auxiliary weight, which is then beyond the limit of the upward swing of the pendulum. Of course, it will be understood that the pendulum need not swing at all in connection with the removal of the auxiliary weight, for if the pendulum remains stationary in its normal position, while the arm 22 moves to the left from the position shown in Fig. 4, the auxiliary weight will be lifted out of the socket in the permanent weight but it is, of course, essential that the pendulum shall, at all times, be nicely poised and be extremely sensitive to the placing of weight upon the scale beam. Consequently, the resistance is not sufficient to overcome the frictional engagement between the trunnions 17 and the lower edges of the openings 26 in the hanger, with the result already described. It will, of course, be understood that the arm 22 not only swings farther than the pendulum when moving to the left, but also swings farther than the pendulum when moving to the right, as the pendulum must be left entirely free when the auxiliary weight is placed upon it. Consequently, when the auxiliary weight has become seated in the permanent weight, with the pendulum against the abutment 28 which limits the swing to the right, arm 22 moves on until it encounters a lower abutment 29, as shown in Fig. 4. This extra movement is sufficient to carry the hanger entirely out of contact with the trunnions 17. The flanges 19 prevent lateral displacement of the auxiliary weight when carried by the hanger, and the conical bases 18 of the trunnions insure the proper engagement of the hanger with the trunnions.

In order to prevent the auxiliary weight from being thrown out of the hanger by violent swing of the latter toward the left and also to insure the seating of the auxiliary weight in the permanent weight when the hanger swings down, the following devices are employed: On the inner side of each of the side pieces 23 and 24 of the hanger there is pivoted at 30 a catch 31 adapted to drop over the trunnion 17 when the latter is seated in the opening 26, (see Fig. 10). The catch has a portion 32 extending beyond the pivot and around the inner end of the opening 26 and an enlarged portion 33 extending in the same direction as the catch proper, this enlarged portion overweighting the latter so as to tend at all times to bring it down in front of the trunnion. The catch is limited in its movements through the engagement of a screw stud 34 with a curved slot 35 in the side of the hanger. The lower edge of the portion 33 is curved, as shown in Fig. 10 and coöperates with a pin 36 projecting from the permanent pendulum weight, there being two of these pins, one for each of the catches. When, in swinging to the left, the hanger advances relatively to the pendulum, the curved lower edges of the catches ride upon the pins 36 and the catches are thus displaced against gravity so that they may pass over the trunnions 17. Then, as the hanger continues to move relatively to the pendulum, the catches pass by said pins 36 and drop over the trunnions. Thus, whenever the auxiliary weight is dislodged from its seat in the permanent weight, the catches are bound to engage the trunnions of the auxiliary weight so that the latter cannot escape from the hanger. It will be noted that with the hanger at its uppermost position, as shown in Fig. 3, the catches overlie the trunnions. Consequently when the hanger drops, the auxiliary weight is backed up by the catches and the latter will operate to enforce the seating of the auxiliary weight in the permanent weight. But as this takes place, the back portions of the curved edges of the catches encounter the pins 36 so that the catches are lifted free of the trunnions, as the hanger swings on to the right and takes up the position shown in Fig. 4, and further illustrated in Fig. 12.

Passing now to the means for operating the auxiliary weight carrier composed of the arm 22 and hanger above described, the sleeve 21 is cut away in its outer end throughout a little more than a half circle forming a pair of shoulders 37, as shown in Fig. 9 and another sleeve 38 fits loosely over the sleeve 21 and against the end thereof, said sleeve 38 having an internal lug 39 (Fig. 8) to act against the shoulders 37. A knob 40 is secured to the sleeve 38 and it will be obvious that by turning said knob to the left the lug 39 acting against one of the shoulders 37 will swing the arm 22 to the left. This arm at its inner end is enlarged into a disk and notched at 41 for coöperation with a gravity latch 42, pivoted upon the casing. When the arm has been swung to its uppermost position this gravity latch drops into the notch 41 and retains the arm at this position. In order to insure the engagement of the latch with the notch and prevent any rebound, the sleeve 38 is provided with a disk 42ᵃ having a curved and tapering finger 43 which, as the knob comes to the end of its leftward movement, takes over a pin 44, projecting outwardly from the latch 42, as illustrated in Fig. 3. In order to guard against the possibility of the gravity latch being thrown over to an inoperative position, a fixed back stop 45 is provided on the casing to limit the upward movement of the latch. The tripping of the latch to cause the auxiliary weight carrier to drop is brought about through the reverse turning of the knob 40. To this end, the disk 42ᵃ is formed with a cam portion 46 adapted to engage under the pin 44 and thus lift the latch out of the notch. Of course, it will be understood that the knob moves for a distance to the right without any effect upon the latch, the lug 39 then simply traversing the space between the shoulders 37. The auxiliary weight and its carrier of course tend to swing by gravity all the way to the right or until the hanger comes up against the abutment 29 and the turning of the knob to the right need not be relied upon to move the carrier, though, of course, the engagement of the lug 39 with the right hand shoulder 37 can enforce the full swing to the right. Other means are preferably employed to assist in swinging the carrier against the abutment 29 and maintaining it in that position. Thus, the arm 22 has a cam formation at 48 and a finger 49 pivoted on the casing is pressed by a spring 49ᵃ against the edge of the arm. The cam 48 is so located that when the arm 22 reaches a vertical position the nose of the finger 49 will press against the edge of the arm so as to swing the lower portion of the latter to the right and hold it there with a yielding pressure, as will be clear from the illustration in Fig. 4. This finger also operates as a brake to slightly retard the auxiliary weight carrier when dropping from its elevated position.

Referring next to the means for alternating the display of price numerals, an arm 50 rises from the pendulum hub 7 and has secured to it an elongated plate 51 overlying the chart of computations and the rows of weight numerals on that side of the plate 6. A somewhat similar elongated plate 52 secured to the plate 51 extends over the opposite side of the plate 6. Thus the body of the index hand is made up and the two elongated plates 51 and 52 are formed at their outer ends with pointers directed toward each other for indicating the weight graduations in varying positions of the index hand, it being understood that the index hand swings with the pendulum. The elongated plate 51 is formed along one edge with a series of fingers 53 spaced apart to correspond with the concentric rows of computation graduations on the chart, these fingers assisting in locating the proper computation. The same elongated plate does not in the present instance, as has before been the case, bear rows of price numerals inscribed directly upon it, but the two rows of price numerals are inscribed upon opposite sides of a strip or bar 54 which, at its upper end is journaled in a bearing 55 on the plate 51 and at its lower end in the overhanging portion of a bracket 56 secured to the arm 50 as shown in Fig. 5. This strip or bar is so located upon the elongated plate 51 that when turned with either side facing outwardly the numerals thus presented to view will register with the index fingers 53 and thus be available for employment in locating the proper computation on the chart. In order to bring the strip or bar near the row of fingers and have the exposed row of price numerals appear with the effect of being inscribed directly upon the elongated plate 51, the latter is concaved throughout the greater portion of its length as shown at 57 in Fig. 14. This provides for the turning of the strip or bar through a half circle without necessitating its being spaced away from the fingers and the exposed right hand portion of the plate 51 the full distance that would otherwise be required to allow for the half rotation. The numerals on one side of the strip or bar represent double the amounts of the numerals on the opposite side throughout the series or substantially so. Thus, where the numeral 3 appears on one side of the strip, indicating a valuation of 3¢ per pound, the numeral 6 will appear on the corresponding part of the opposite side of the strip. It will of course be understood that the numerals representing the lesser prices per pound will be exposed to view when the scales are being used under the greater weighing capacity, whereas when the scales are being used under the lesser weighing capacity the strip or bar will present to view the set of price numerals representing the greater amounts. The contrasting color scheme will preferably be preserved, the lesser row of price numerals being colored red, for example, whereas the other row of price numerals is colored black. Correspondingly, the upper row of weight numerals on the chart will appear in red on both sides of the plate 6 and the lower row in black. The lower spindle or arbor 60 of the strip or bar 54 is elongated, as clearly shown in Fig. 5, and passed through a doubled back portion of the bracket 56 in which there is contained a small gear wheel 61 pinned to said spindle. In the lower part of the bracket 56 there is journaled a short shaft 62 having secured to it a crown gear segment 63 which meshes with the small gear wheel 61 and is limited in movements to and fro by arms of a bracket 64 secured to the arm 50. It will be obvious that the movements of the segment to and fro will oscillate the strip or bar 54 and that such movements can be measured so as to provide for a half rotation of the strip or bar one way or the other. A small counter-weight 65 is preferably secured to the spindle 60 just above the bracket 56 so as to prevent the swinging of the segment 63 affecting the equilibrium of the pendulum structure. Thus when the segment swings to the left the counter-weight swings to the right, and vice versa.

The reversible price bar above described is of course shifted one way or the other according as the auxiliary weight is removed from or placed upon the pendulum. The shifting of this price bar is therefore controlled by the auxiliary weight carrier. To this end there is secured to the arm 22 a substantially semi-circular branch 66 which extends to the upper side of the pendulum structure and carries a pair of cam structures 67 and 68 arranged to coöperate with a wrist pin 69 on a crank 70 of the short shaft 62, said wrist pin being preferably equipped with a roller 71 as clearly shown in Fig. 6. The two cam strips above mentioned are preferably turned up from a base plate 72 which is secured to the rear side of the branch 66 as shown in Fig. 7. The upper strip 67 is turned up at both ends, presenting inclined surfaces between which there is a limited straight surface. The lower strip 68 comprises a portion extending parallel with the middle part of the upper strip and a downturned end portion at an acute angle to the first-mentioned portion, forming with the left-hand upturned end of the strip 67 a flaring mouth or opening as shown in Fig. 7. The formation is somewhat similar at the other side of the cam piece, though here the strip 68 is simply beveled and there is no downturned end portion.

With the auxiliary weight off the pendulum and its carrier held at its extreme left hand position, as shown in Fig. 3, the above described cam piece is positioned at the extreme right, so that when the scales stand at normal the wrist pin of the crank 70 is some distance from either cam strip. Under this adjustment the price bar 54 is presenting the black row of numerals, which are the higher ones when the scales are operating under the lower weighing capacity. Hence the segment 63 is in its right hand position and the crank 70 is directed upwardly. This condition obtains so long as the auxiliary weight remains off the pendulum. When the auxiliary weight carrier is released by the turning of the knob 40 to the right, the consequent swing of the branch 66 will carry the upper cam strip 67 over the wrist pin 69 and the crank 70 will thereby be turned, rocking the segment 63 to the left and reversing the price bar 54. In this operation the cam strip 67 strikes the wrist pin about at the junction of the middle portion of the strip and its left hand upturned end portion and such middle portion of the strip acts with a camming effect upon the wrist pin. When the auxiliary weight carrier has reached the limit of its swing to the right this middle portion of the cam strip 67 has passed by the wrist pin. The swing of the pendulum to the left with the auxiliary weight upon it of course carries the wrist pin away from the cam strip and the swing of the pendulum back and forth does not disturb the adjustment of the price bar. When the auxiliary weight carrier is swung to the left to remove the auxiliary weight from the pendulum, movement of said carrier in such direction in advance of or beyond the pendulum will cause the lower cam strip 68 to act with a camming effect upon the wrist pin and thereby rock the crank 70 so as to swing the segment 63 to the right and thus again reverse the price bar 54. It will be understood that it is the confronting, substantially parallel portions of the cam strips 67 and 68 which are effective upon the wrist pin and that the inclined end portions of said strips serve as guards to prevent derangement of the parts as by the wrist pin's being caught on the outer side of either cam strip.

Ordinarily in the use of scales of the character described the table of computations appears only on one side of the chart plate and that is of course the side toward the user of the scale. Sometimes this same side of the scale will be the one exposed to the view of the customer, but frequently the customer will be on the opposite side of the scales. It has heretofore been mentioned that the rows of weight numerals are duplicated on the other side of the plate 6. This is illustrated in Fig. 2, where the housing 4 is represented as closed except for a curved slot or opening at the upper part sufficient to expose these two rows of weight numerals. In order to indicate to the customer by an unmistakable sign the capacity under which the scale is operating, in addition to the indication afforded by the presence or absence of the auxiliary weight in the pendulum (the pendulum being visible from both sides of the scales), the following described device is preferably employed. Behind a horizontal opening 80 in the housing there is arranged a plate 81 of sufficient height to expose two different portions through such opening and on such two different portions are inscribed two different legends, one preferably in black and the other in red, and the former being for example "Read black figures," the latter being "Read red figures." The plate 81 is carried on a bar 82 mounted to slide up and down on the inner side of the housing and this bar is provided at its lower portion with two laterally extending arms 83 and 84. Between these two arms works a pin 85 projecting rearwardly from the branch 66 of the arm 22. When said arm is in its right hand position, as illustrated in Fig. 4, the pin 85 bears upon the lower arm 84 of the bar 82 and thus holds the plate 81 in its lower position exhibiting through the opening 80 the legend "Read red figures." On the other hand, when the arm 22 is in its uppermost position said pin 85 bears against the upper arm 83 of the bar 82 and holds said bar up and the plate 81 in its upper position exhibiting through the opening 80 the legend "Read black figures."

It will now be seen that all of the objects primarily stated are fulfilled by a construction such as above described. At the same time it is to be understood that such construction is susceptible of considerable variation without departing from the spirit and scope of the invention.

What is claimed is:

1. In weighing scales of the character described, the combination with a pendulum and a removable weight therefor, of a carrier swinging on the same center as the pendulum and adapted to wholly support the removable weight at all times when the same is off the pendulum.

2. In weighing scales of the character described, the combination, with the pendulum and its removable weight, of a carrier swinging on the same center as the pendulum and adapted to wholly support the removable weight at all times when the same is off the pendulum, said carrier having a socket to receive the weight.

3. In weighing scales of the character described, the combination, with the pendulum and its removable weight, of a carrier swinging on the same center as the pendulum and adapted to wholly support the removable weight at all times when the same is off the pendulum, said carrier having side pieces notched to receive the weight.

4. In weighing scales of the character described, the combination with the pendulum and its removable weight, of a pendent arm swung from the same center as the pendulum and carrying a hanger with notched side pieces in which portions of the said weight may seat.

5. In weighing scales of the character described, the combination, with the pendulum and its removable weight, of a carrier swinging on the same center as the pendulum and adapted to wholly support the removable weight at all times when the same is off the pendulum, said carrier having means for preventing independent movement of said weight.

6. In weighing scales of the character described, the combination, with the pendulum and its removable weight, of a carrier swinging on the same center as the pendulum and adapted to wholly support the removable weight at all times when the same is off the pendulum, said carrier having a gravity catch for preventing independent movement of said weight.

7. In weighing scales of the character described, the combination with the pendulum and its removable weight, of a carrier swinging on the same center as the pendulum and adapted to wholly support the removable weight at all times when the same is off the pendulum, said carrier having a gravity catch for preventing independent movement of said weight, and the pendulum having a projection to displace said catch.

8. In weighing scales of the character described, the combination with the pendulum and its removable weight, of a carrier swinging on the same center as the pendulum and adapted to wholly support the removable weight at all times when the same is off the pendulum, said carrier having a socket to receive the weight and a gravity catch to keep the weight in the socket.

9. In weighing scales of the character described, the combination, with the pendulum and its removable weight, of a carrier swinging on the same center as the pendulum and adapted to wholly support the removable weight at all times when the same is off the pendulum, said carrier having side pieces notched to receive the weight and gravity catches to keep the weight in the notches.

10. In weighing scales of the character described, the combination, with the pendulum and its removable weight, of a carrier swinging on the same center as the pendulum and adapted to wholly support the removable weight at all times when the same is off the pendulum, said carrier having side pieces notched to receive the weight and gravity catches to keep the weight in the notches, and the pendulum having projections to displace the catches.

11. In weighing scales the combination of a pendulum having lateral projections and a permanent weight with a socket opening out of one side, a removable weight having a central reduced portion to engage said socket and lateral projections or trunnions, an arm swung concentrically with the pendulum but movable independently thereof and through a greater arc, said arm having a hanger adapted to embrace the permanent and removable weights of the pendulum, and formed with sockets to receive the trunnions of the latter, and gravity catches pivotally mounted on the said hanger and tending to engage over said trunnions and confine the latter in the sockets of the hanger, said catches having cam edges to coöperate with the projections on the pendulum when the arm swings beyond the latter and thereby permit the deposit of the removable weight in the socket of the permanent weight.

12. In weighing scales the combination of a pendulum having lateral projections and a permanent weight with a socket opening out of one side, a removable weight having a central reduced portion to engage said socket and lateral projections or trunnions, an arm swung concentrically with the pendulum but movable independently thereof and through a greater arc, said arm having a hanger adapted to embrace the permanent and removable weights of the pendulum, and formed with sockets to receive the trunnions of the latter, and gravity catches pivotally mounted on the said hanger and tending to engage over said trunnions and confine the latter in the sockets of the hanger, said catches having double cam edges to coöperate with the projections on the pendulum when the arm swings beyond the latter in either direction and thereby permit the deposit of the removable weight in the socket of the permanent weight, or cause the catches to take over the trunnions of the removable weight.

13. In weighing scales the combination of a pendulum having lateral projections and a permanent weight with a socket opening out of one side and having a central depression, a removable weight having a central reduced portion to engage said socket and lateral projections or trunnions, an arm swung concentrically with the pendulum but movable independently thereof and through a greater arc, said arm having a hanger adapted to embrace the permanent and removable weights of the pendulum and formed with flaring sockets to receive the trunnions of the latter, the edges of such sockets acting to cam the removable weight out of the depression in the permanent weight, and gravity catches pivotally mounted on the said hanger and tending to engage over said trunnions and confine the latter in the sockets of the hanger, said catches having cam edges to coöperate with the projections on the pendulum when the arm swings beyond the latter and thereby permit the deposit of the removable weight in the socket of the permanent weight.

14. In weighing scales of the character described, the combination with the pendulum and its removable weight, of an arm swinging on the same center as the pendulum and adapted to remove the said weight therefrom and support it beyond the pendulum swing, a latch for holding the said arm elevated, and a back stop for the latch.

15. In weighing scales of the character described, the combination with the pendulum and its removable weight, of an arm swinging on the same center as the pendulum and adapted to remove the said weight therefrom and support it beyond the pendulum swing, a latch for holding the said arm elevated, and a handle with means for elevating the arm and having a finger to guard said latch.

16. In weighing scales of the character described, the combination with the pendulum and its removable weight, of an arm swinging on the same center as the pendulum and adapted to remove the said weight therefrom and support it beyond the pendulum's swing, a latch for holding the said arm elevated, said latch having a projection, and an oscillatory knob with means for elevating the arm and having a finger to take over said lateral projection of the latch.

17. In weighing scales of the character described, the combination with the pendulum and its removable weight, of an arm swinging on the same center as the pendulum and adapted to remove the said weight therefrom and support it beyond the pendulum's swing, a latch for holding said arm elevated said latch having a lateral projection, and an oscillatory knob with means for elevating the arm and having a finger to take over said lateral projection of the latch, and a cam to act against the projection for displacing the latch, the knob having a lost motion engagement with the arm.

18. In weighing scales of the character described, the combination with the pendulum and its removable weight, of an arm swinging on the same center as the pendulum and adapted to remove the said weight therefrom and support it beyond the pendulum's swing, said arm having a shouldered journal and a notched disk, a pivoted gravity latch adapted to engage the latter for holding the arm elevated and having a lateral projection, and a sleeve loose on the journal of the arm and having a lug to engage the shouldered part thereof, said sleeve having a knob and a disk with a cam edge to act upon the lateral projection of the latch and an oppositely located finger to take over said projection, substantially as and for the purpose described.

19. In scales of the character described, the combination with the computation chart, the removable weight, the pendulum structure comprising the pendulum proper and a bar extending over said chart and having two sets of price numerals with provisions for alternately exposing the same to view according as the removable weight is on or off the pendulum, of a crank piece carried by the pendulum structure and operatively connected with the aforesaid provisions for alternately exposing the two sets of price numerals, and an arm swinging from the same center as the pendulum structure and adapted to remove the weight therefrom, said arm equipped for coaction with said crank piece substantially as and for the purpose described.

20. In scales of the character described, the combination with the computation chart, the removable weight, the pendulum structure comprising the pendulum proper and a bar extending over said chart and having two sets of price numerals with provisions for alternately exposing the same to view according as the removable weight is on or off the pendulum, of a crank piece carried by the pendulum structure and operatively connected with the aforesaid provisions for alternately exposing the two sets of price numerals, and an arm swinging from the same center as the pendulum structure and adapted to remove the weight therefrom, said arm equipped for camming said crank piece to and fro, substantially as and for the purpose described.

21. In scales of the character described, the combination with the computation chart, the removable weight, the pendulum structure comprising the pendulum proper and a bar extending over said chart and having two sets of price numerals with provisions for alternately exposing the same to view according as the removable weight is on or off the pendulum, of a crank piece carried by the pendulum structure and operatively connected with the aforesaid provisions for alternately exposing the two sets of price numerals, and an arm swinging from the same center as the pendulum structure and adapted to remove the weight therefrom, said arm carrying cam-strips coacting with said crank piece to swing it to and fro, substantially as and for the purpose described.

22. In scales of the character described, the combination with the computation chart, the removable weight, the pendulum structure comprising the pendulum proper and a bar extending over said chart and having two sets of price numerals with provisions for alternately exposing the same to view according as the removable weight is on or off the pendulum, of a crank piece carried by the pendulum structure above the latter's fulcrum and operatively connected with the aforesaid provisions for alternately exposing the two sets of price numerals, and a pendent arm swinging from the same center as the pendulum structure and adapted to remove the weight therefrom, said arm having a branch extending above the fulcrum of the pendulum structure and equipped for coaction with said crank-piece, substantially as and for the purpose described.

23. In scales of the character described, the combination with the computation chart, the removable weight, the pendulum structure comprising the pendulum proper and a bar extending over said chart and having two sets of price numerals with provisions for alternately exposing the same to view according as the removable weight is on or off the pendulum, of a crank piece carried by the pendulum structure above the latter's fulcrum, and operatively connected with the aforesaid provisions for alternately exposing the two sets of price numerals, and a pendent arm swinging from the same center as the pendulum structure and adapted to remove the weight therefrom, said arm having a branch extending above the fulcrum of the pendulum structure and equipped for camming said crank-piece to and fro, substantially as and for the purpose described.

24. In scales of the character described, the combination with the computation chart, the removable weight, the pendulum structure comprising the pendulum proper and a bar extending over said chart and having two sets of price numerals with provisions for alternately exposing the same to view according as the removable weight is on or off the pendulum, of a crank piece carried by the pendulum structure above the latter's fulcrum and operatively connected with the aforesaid provisions for alternately exposing the two sets of price numerals, and a pendent arm swinging from the same center as the pendulum structure and adapted to remove the weight therefrom, said arm having a branch extending above the fulcrum of the pendulum structure and carrying cam-strips coacting with said crank-piece to swing it to and fro.

25. In scales of the character described, the combination with the computation chart, the pendulum structure comprising pendulum proper and a portion extending above the fulcrum and over the chart, and a removable weight; of a reversible price bar journaled on the upwardly extending portion of the pendulum structure and carrying a gear, a segment meshing with the latter and also journaled on said upwardly extending portion of the pendulum structure, a crank on the journal of said segment and having a wrist pin, and a pendent arm swinging from the same center as the pendulum structure and adapted to remove the weight therefrom, said arm having a branch extending above the fulcrum of the pendulum structure and equipped for coaction with the wrist pin of said crank, substantially as and for the purpose described.

26. In scales of the character described, the combination with the computation chart, the pendulum structure comprising pendulum proper and a portion extending above the fulcrum and over the chart, and a removable weight; of a reversible price-bar journaled on the upwardly extending portion of the pendulum structure and carrying a gear, a segment meshing with the latter and also journaled on said upwardly extending portion of the pendulum structure, a crank on the journal of said segment and having a wrist pin, and a pendent arm swinging from the same center as the pendulum structure and adapted to remove the weight therefrom, said arm having a branch extending above the fulcrum of the pendulum structure and equipped for cam action on the wrist-pin of said crank, substantially as and for the purpose described.

27. In scales of the character described, the combination with the computation chart, the pendulum structure comprising pendulum proper and a portion extending above the fulcrum and over the chart, and a removable weight; of a reversible price-bar journaled on the upwardly extending portion of the pendulum structure and carrying a gear, a segment meshing with the latter and also journaled on said upwardly extending portion of the pendulum structure, a crank on the journal of said segment and having a wrist-pin, and a pendent arm swinging from the same center as the pendulum structure and adapted to remove the weight therefrom, said arm having a branch extending above the fulcrum of the pendulum structure and carrying cam-strips for coacting with the wrist-pin of said crank substantially as and for the purpose described.

28. In computing scales of the character described, the combination with the chart, of an index hand arranged to sweep over the same and being concave-convex in cross-section, and a reversible strip or bar mounted on said hand and bearing different series of price numerals on opposite sides, the concave formation of the hand accommodating the edge of said strip or bar in half rotation thereof, substantially as and for the purpose described.

LEWIS C. WETZEL.

Witnesses:
ALLEN DE VILBISS, Jr.,
M. L. THOMPSON.

---

Copies of this patent may be obtained for five cents each, by addressing the "Commissioner of Patents, Washington, D. C."